United States Patent [19]

Hamilton

[11] Patent Number: 4,679,705
[45] Date of Patent: Jul. 14, 1987

[54] FLUID SUPPLY SYSTEM, A CONNECTOR AND A VALVE

[75] Inventor: Malcolm F. Hamilton, Southminster, England

[73] Assignee: Hozelock-ASL Ltd., Buchinghamshire, England

[21] Appl. No.: 404,790

[22] Filed: Aug. 3, 1982

[30] Foreign Application Priority Data

Jan. 14, 1982 [GB] United Kingdom ............... 8201041

[51] Int. Cl.$^4$ .............................................. B67B 7/26
[52] U.S. Cl. ..................................... 222/90; 222/212; 222/548; 251/344; 251/345
[58] Field of Search ...................... 222/81, 80, 89, 90, 222/92, 96, 107, 544, 548, 557, 547, 537, 531, 553, 520, 545, 206, 215, 211, 212, 85, 86; 251/343, 344, 345; 285/3; 403/354, 350

[56] References Cited

U.S. PATENT DOCUMENTS

| | | | |
|---|---|---|---|
| 2,061,582 | 11/1936 | Luthi | 222/85 |
| 3,030,952 | 4/1962 | Elder | 222/206 |
| 3,277,922 | 10/1966 | Eisel | 251/344 |
| 3,305,135 | 2/1967 | Lemoire | 222/90 |
| 3,369,708 | 2/1968 | Hein | 222/85 |
| 3,792,799 | 2/1974 | Henfrey | 222/90 |
| 4,010,786 | 3/1977 | Aguettart et al. | 222/80 |
| 4,076,147 | 2/1978 | Schmit | 222/89 |
| 4,177,947 | 12/1979 | Menzel | 239/542 |
| 4,421,297 | 12/1983 | Pongrass et al. | 251/345 |

FOREIGN PATENT DOCUMENTS

| | | | |
|---|---|---|---|
| 407456 | 6/1969 | Australia | 251/345 |
| 1928214 | 6/1969 | Fed. Rep. of Germany . | |
| 2525000 | 12/1976 | Fed. Rep. of Germany | 222/89 |
| 549938 | 6/1974 | Switzerland . | |
| 558900 | 2/1975 | Switzerland | 251/344 |
| 466672 | 6/1937 | United Kingdom | 251/345 |
| 1446465 | 8/1976 | United Kingdom . | |

Primary Examiner—Joseph J. Rolla
Assistant Examiner—Kenneth Noland
Attorney, Agent, or Firm—Neil F. Markva

[57] ABSTRACT

A fluid supply system has a plastics bag reservoir into which the other parts of the system may be packed. The other parts of the system include a flow pipe, a connector to connect the pipe to a wall of the reservoir and fluid supply outlet drip-valves. The connector may be in two or three parts and may be arranged to puncture a hole in the reservoir wall and grip the wall as the parts of the connector are interengaged. Each drip-valve is adjustable to vary the amount of fluid supplied from the reservoir to a grow-bag.

17 Claims, 4 Drawing Figures

FLUID SUPPLY SYSTEM, A CONNECTOR AND A VALVE

BACKGROUND OF THE INVETION

This invention relates to a fluid supply or irrigation system and more particularly but not exclusively to such a system including a reservoir in the form of a plastics bag which is, in use, connected to drip outlets, via a length of piping, which outlets are located, for example, above a grow-bag containing compost, and also relates to a connector to connect, for example, the bag to the piping, and to a valve.

SUMMARY OF THE INVENTION

According to the present invention a fluid supply system comprises a reservoir and at least one length of piping connectable, or connected, thereto by a connector. The connector has at least a first piece and a second piece which are capable of being, or which are, snap-locked together with a wall of the reservoir gripped therebetween, and with the connector surrounding a hole in the wall of the reservoir. The connector and said length of piping are co-operable to engage, or are in engagement with, each other so that, in use of the supply system, fluid is capable of being supplied from the reservoir through the connector and hole and through the length of piping to one or more supply outlets. The reservoir is of such size and dimensions relative to the remainder of the system that said remainder is capable of being, or is, wholly contained in said reservoir when said remainder is not connected to said reservoir.

The first piece alone may be co-operable to engage, or be in engagement with, said length of piping.

Further according to the present invention there is provided a connector suitable for use as the connector in the system as described in the immediately preceding paragraph.

In one embodiment of the connector, the first and second pieces are generally tubular and one of the first and second pieces has a male connecting portion at one end thereof to snap into a female portion of the other one of the first and second pieces. The female portion includes radially extending flange means to axially locate the male connecting portion in a snap-fit manner with the female portion. The female portion and/or the male portion may be resiliently deformed as said male portion is engaged therein.

In another embodiment of the connector, said connector includes a third piece, the first piece being a snap-fit engagement with the third piece and the second piece being a snap-fit engagement with one end of the third piece. The ends of the third piece may be substantially identical and the ends of the third piece may extend beyond the ends of the first piece so that the pipe may be attached to the end of the third piece not engaging, or not intended to engage, the second piece. The first piece may be substantially identical with the second piece. As the connector is assembled to the reservoir the first piece may not be resiliently deformed, but snap-locked against an abutment on the second piece substantially simultaneously as the second and third pieces are snap-locked together.

In the fluid supply system, the connector may include means to puncture a hole in the wall of the reservoir, and this means may be effected automatically as the first and second pieces are snap-locked together with said wall of the reservoir therebetween. The hole puncturing means may be provided on one of the first and second pieces or on the third piece. Hole puncturing means may be provided at each end of the third piece so that this piece is in effect reversible. The hole puncturing means is conveniently in the form of arrow-head shape.

Preferably, the first and second pieces flare outwardly at their ends which are, or which are to be held, adjacent in use, and said wall may be held, in use, between said adjacent ends.

The connector may be releasably snap-lockable with a wall of the reservoir gripped therebetween.

It is an advantage of the system that the reservoir may contain all the other individual components of the system so that the reservoir serves as the packaging for the system, thereby eliminating the costs in supplying the system to the consumer, which would normally include the costs of packaging.

Still further according to the present invention there is provided a connector suitable for connecting two regions together separated by a frangible membrane. The connector comprises at least a first piece and a second piece which are capable of being snap-locked together with a frangible membrane gripped therebetween and with the connector surrounding a hole in the membrane made by the connector. Puncturing means on the connector is adapted to make a hole in a frangible membrane as the connector is attached to and grips the membrane. One of said first and second pieces includes an integral or non-integral male portion providing said puncturing means which is capable of puncturing the frangible membrane as it is located in a female portion of the other of said first and second pieces. After said puncturing, said male portion is axially located in a snap-fit manner with the female portion.

Still further according to the present invention a connector connects two regions together separated by a wall or partition. The connector comprises at least a first piece and a second piece which are capable of being releasably snap-locked together with a wall or partition gripped therebetween. The connector surrounds a hole in the wall or partition. The first piece includes an integral or non-integral male portion, which in use passes through the hole in the wall and is snap-locked in a female portion of the second piece which is generally tubular. The female portion comprises a bore and a first portion of the bore is flared in a direction towards the first piece when said first and second pieces are releasably locked together. The arrangement is such that in locking the said pieces together, as the male portion is inserted in the female portion, the flared first portion of the bore is engaged by a head of the male portion which resiliently deforms the second piece and/or is itself resiliently deformed until the head snap-engages a locking abutment on the female portion, at which location an annular gap is defined between the female portion and the male portion between the head and the remainder of the first piece. The first piece is separable from the second piece first by closing the gap, for example, by applying pressure at opposed locations at the end of the second piece nearest the first piece, to thereby move said locking abutment in relation to said head so that said head and male portion may then be retracted from said female portion.

Still further according to the present invention there is provided a two-part progressive flow valve for a fluid supply system in which the first part is snap-engageable into the second part and relatively rotatable therein between first and second angular positions. The arrangement is such that in the first angular position the valve is closed and in the second angular position the valve is fully open. The second part has a circular seating portion corresponding in diameter to a first circular portion of the first part so that in use the first portion is seated in the seating portion and rotatable about the axis of the seating portion. Each of the first and second parts includes a further circular portion arranged eccentrically to one another. The further portion of the first part includes a bore extending generally radially thereof which bore is blocked off by the further portion of the second part in the first angular position with said two further portions being in engagement with a gap remote from a region surrounding the bore between said further portions. In the second angular position, the bore is not blocked off and the valve is fully open and there is gap near the region surrounding the bore between said further portions.

Advantageously, the second part is made of transparent plastics so that the first part may be viewed therethrough. This may enable a blockage in the valve to be seen.

The design of the valve is advantageous because it may easily be cleaned by applying pressure in a reverse direction to the flow path through the valve.

A particular embodiment is a drip-feed valve in which the aforementioned eccentricity is slight and over a wide angle of rotation the rate of flow through the valve may be increased only slightly.

Advantageously, the first and second angular positions are 180° apart.

BRIEF DESCRIPTION OF DRAWINGS

An embodiment of a fluid supply system in accordance with the present invention will now be described by way of example only, with reference to the accompanying drawings, in which.

DETAILED DESCRIPTION

Figure 1:
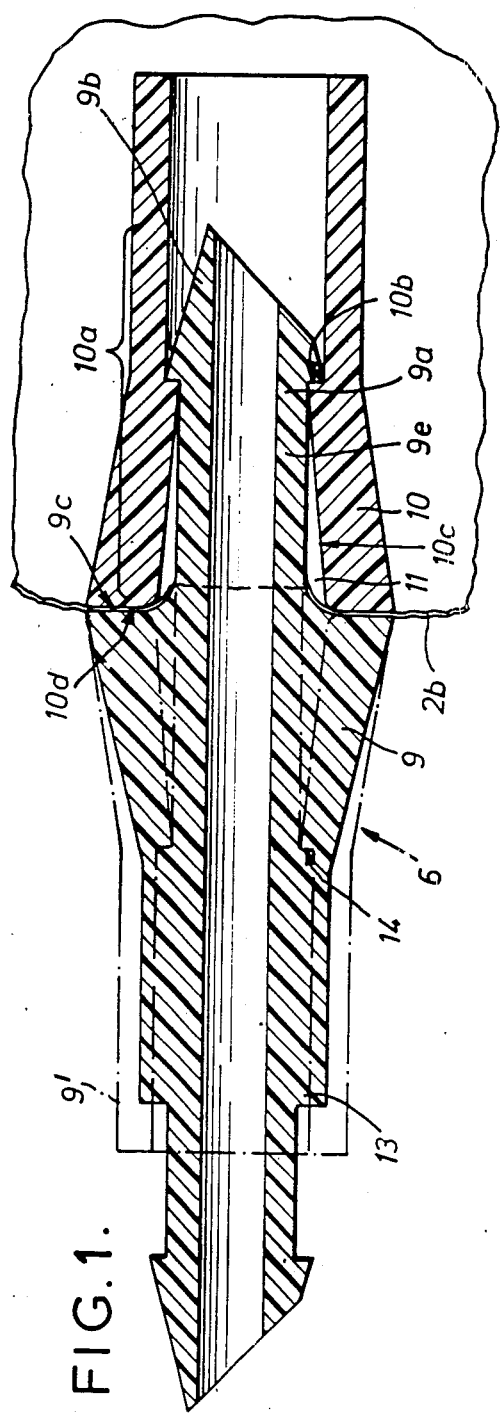
FIG. 1 shows a cross-sectional view of a connector of the system and also a modified connector partly in chain-dotted lines.
Figure 2:
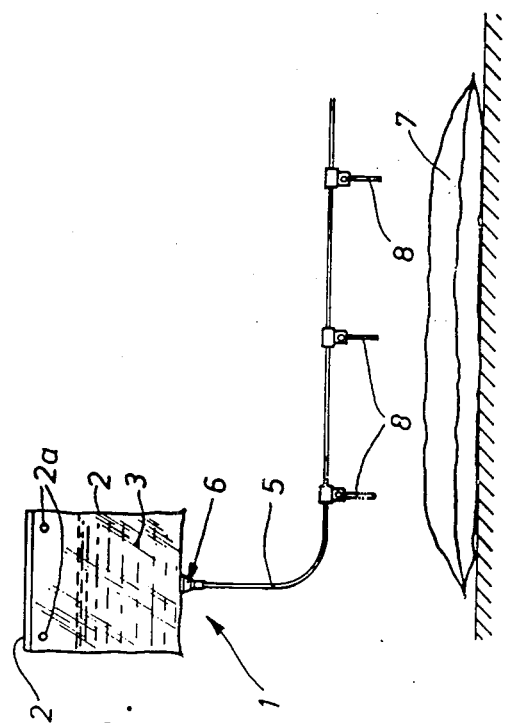
FIG. 2 shows a simplified schematic arrangement of the fluid supply system.

Referring to FIGS. 1 and 2, a fluid supply or irrigation system, generally designated 1, consists or a reservoir in the form of a plastics re-sealable bag 2, which contains a fluid 3, such as water or water containing nutrients for the growing of plants or vegetables. A length of piping 5 is connected to the bottom of the bag 2 by a connector 6 (shown in detail in FIG. 1) and extends over a grow bag 7 which is open and which contains compost and matter to be grown, for example, seeds therein. A series of drip feed outlets 8 (three in number) are arranged along the length of piping 5 and along the grow bag 7 to feed the fluid contents 3 of the bag 2 to the contents of the grow-bag 7 in a predetermined manner. The bag is provided with two holes 2a so that it may be hung up on a vertical surface as by, for example, hooks. Any suitable means may be provided by which the bag may be hung up, for example, a handle may be provided.

The connector 6 is of hard plastics but could be of any suitable material and is shown in one form in FIG. 1 by solid lines and in a modified form partly in accordance with the chain-dotted lines. In the first form the connector has a generally tubular first piece 9 and a generally tubular second piece 10 only. The first and second pieces are axially aligned and are non-releasably lockable to one another by a snap-fit engagement with a wall or membrane 2b of the reservoir gripped therebetween.

The first piece 9 has an integral male connecting portion 9 at the right-hand end thereof in snap-fit engagement with a female portion 10a of the second piece 10. The female portion 10a includes a radially inwardly extending flange or locking abutment 10b against which a head 9b of the male connecting portion 9a is axially located to restrain the first and second pieces (9, 10) from being separated by relative axial movement away from one another.

In assembling the connector 6 to the bag 2 the second piece 10 is introduced into position inside the bag 2 while the first piece 9 is aligned axially with second but with the male portion 9a outside the bag. In this embodiment, the head 9b of the male connecting portion 9a is an arrow-head shape because it is used to puncture a hole in the membrane 2b as the male portion 9a is first inserted in the female portion 10a. Alternatively, the bag 2 may already have a suitable hole or other means may be used to make the hole prior to entry of the male portion 9a into the female portion 10a. In this embodiment, as the male portion 9a is inserted axially in the female portion 10a the arrow-head punctures the membrane 2b and engages a flared or part-conical inner surface 10c of the female portion and both the head 9b and the second piece 10 are resiliently deformed until the head passes axially beyond the flange 10b to be axially seated thereon, substantially simultaneously as similar annular surfaces 10d and 9c of the second and first pieces respectively align and grip the edge of the membrane 2b surrounding the hole therebetween. An annular flared gap 11 is defined between the female portion 10a and a neck 9e of the male portion 9a which serves to trap any bits of plastics material created by puncturing the hole in membrane 2b. The gap 11 prevents the bits from entering pipe 5.

The left-hand end of the first piece 9 is similar to its right-hand hand and may be fitted into the pipe 5 which is co-operable therewith. The first piece 9 has an axial bore of lesser diameter than the female portion 10a to allow fluid to flow from the bag 2 to the pipe 5 and hence to the grow-bag 7 via drip feed outlets 8.

In a disassembled state all the aforementioned components of the system may be contained wholly within the bag 2, so that no other packing to sell the system to a buyer is necessary i.e. the bag itself provides such packaging. The bag 2 is also provided with a snap seal 12 so that it may be opened to receive fluid contents and closed to prevent the ingress of contaminating materials into the fluid contents.

It is to be noted that the second connector piece 10 extends some way inside the bag 2, and also some way beyond the head 9b of the male portion 9a. The connector piece 10 extends some way inside the bag 2 so that any particles or sediment in the fluid 5 which settle at the bottom of the bag are restrained from flowing down the pipe 5. This may be an important feature, for example, where there is a likelihood that the drip feed outlets 8 would become blocked by sediment. Preferably, in such instance the second piece 10 extends about 1.75 cm from the membrane into the bag 2, and other relative dimensions of the connector 6 which are considered advantageous can be obtained directly from FIG. 1. In particular the distance from abutment 10b to the right-hand end to the second piece 10 is 1 cm and this advantageously provides a thumb-protector when the first and second pieces (9, 10) are assembled together with the membrane 2b in between. The flared end of the first piece 9 can be gripped between finger and thumb of one hand. The second piece 10 can be gripped between first and second fingers on the other hand with the thumb over the open right-hand end of the second piece 10. As the head 9b is inserted into the female portion 10a it cannot project beyond the second piece and therefore any injury to the hand, or thumb in particular, should be avoided.

There are many possible modifications to the connector which are within the spirit of the present invention, one of which is shown partly in chain-dotted lines in FIG. 1. In this modified embodiment the connector consists of three pieces; the second piece 10 is not modified, the first piece 9' has been modified and has an outer and inner shape now identical with the second piece 10. The third piece consists of the male portion 9a which now axially extends through the first portion at its left-hand end. The ends of the third piece are identical with respect to each other. In assembling the connector 6 to the membrane 2b, the first and second pieces (9, 10) are axially aligned and the third piece is moved axially to snap the head 9b behind the flange 10b and substantially simultaneously snap-locking the third piece to the first by the engagement of a thickened diameter portion 13 engaging a flange 14 (which is exactly similar to flange 10b) on the first piece. The pipe 5 may be connected to the left-hand side of the third piece.

The surfaces 9c and 10d may be provided with gripping means to help grip membrane 2b, for example, said surfaces may have mating corrugations.

The connector 6 may have releasably snap-lockable first and second pieces. In the embodiment described, release may be achieved by closing the gap 11 as by gripping the second piece 10 at its end nearest the first piece 9 at opposing locations, thereby moving the flange 10b radially outwardly relative to the head so that the head may be axially retracted.

In order to assist the movement of flange 10b pips may be provided on surface 10c to engage neck 9e or vice versa and/or the material of the connector may be chosen to assist such releasable locking action.

It is to be appreciated that the male portion 9a could be on the second piece 10 and the female portion 10a on the first piece 9, so that when assembled to the bag the male portion 9a lies outside the bag 2. Additionally, the right-hand/end of the second piece 10 may be substantially identical with the left-hand end of the first piece 9.

Figure 3:
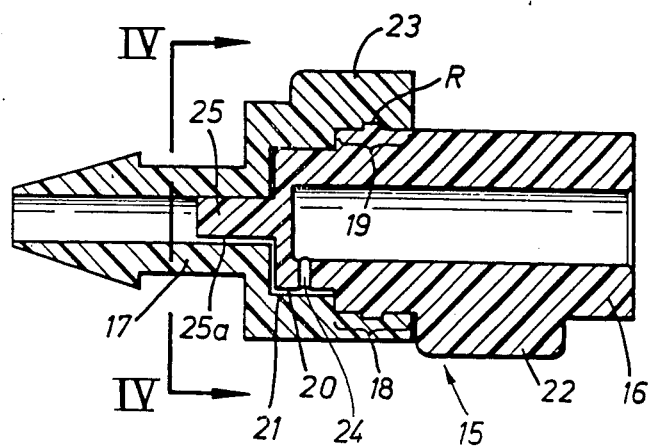
FIG. 3 shows a sectional view of a progressive flow valve of the system.

FIG. 3 shows a sectional view of a two part plastics progressive-flow, drip-feed valve 15 which is suitable for one or more of the drip feed outlets 8 in the fluid supply system 1.

The valve 15 comprises a first part 16 which is snap-engageable into a second part 17 and relatively rotatable therein between first and second angular positions. As shown in FIG. 3, the valve is in a fully open position (second angular position).

The second part 17 shows a circular seating portion 18 of diameter corresponding to the diameter of a first circular portion 19 of the part 16. The circular portion 19 has a raised annular rib R which is snap-engaged into a matching annular recess in the second part 17 as the first part 16 is pushed into the second part 17 and as shown. The first part 16 is restrained from being pulled out axially from the second part 17 but is freely rotatable relative thereto.

Most importantly the first part 16 has a further circular portion 20 which is arranged eccentrically to a further circular portion 21 of the second part 17. On rotation of the first part 16 relative to the second part 17 from the FIG. 3 position and through 180° in either rotational direction, the valve is fully closed and in the first angular position. Each part 16, 17 is provided with a tab 22, 23 so that the fully closed position is readily ascertained by alignment of the tabs 22, 23 parallel with the valve axis.

The eccentricity of said further circular portions 20, 21 is slight over a wide angle of relative rotation of the parts 16, 17 so that the rate of flow through the valve can be increased only slightly in stages up to the maximum flow rate when the valve is in the fully open position. A radial bore 24 in the first part 16 provides flow communication between parts 16, 17 as shown in FIG. 3. In the fully closed position, the bore 24 is blocked off by engagement of said further circular portions 20, 21. On relative rotation from the fully closed position a gap appears between portions 20, 21 in a region surrounding the bore 24 which gradually increases through 180° until the maximum gap at the fully open position.

The described embodiment of valve provides a very sensitive drip-feed valve.

Figure 4:
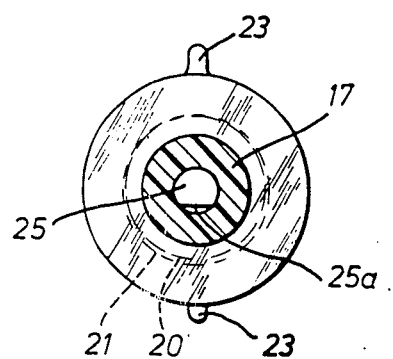
FIG. 4 shows a sectional view taken on the line IV—IV of FIG. 3.

The first part 16 is provided with a generally cylindrical axial extension 25 with a flattened axial edge 25a (see FIG. 4) arranged radially nearest the bore 24 to help control the flow through the valve 15.

The second part 17 may conveniently be transparent so that the first part 16 may be viewed therethrough. This may enable a blockage in the valve to be seen. The valve may easily be cleaned by applying pressure in a reverse direction to flow path through the valve. The left-hand end of the second part 17 (as shown in FIG. 3) is suitable for connection to the flow pipe 5 of the fluid supply system 1 and is generally of arrow-head shape, the normal-flow direction being from left to right as shown in FIG. 3. Alternatively or additionally the first part 16 may be suitable for connection to a flow pipe.

The circular portion 20 may be eccentric, or alternatively concentric with the axis of the first part 16 and accordingly the portion 21 may be concentric or eccentric respectively with said axis.

It is believed that the relative dimensions of the valve are particularly advantageous and a small, lightweight, drip valve, capable of providing a small increase in flow rate over a wide angle of relative rotation of the first and second parts is realizable. In one embodiment the axial length of the valve is about 27 mm.

The tabs 22, 23 provide an effective alignment means so that the closed and open positions of the valve 15 may readily be ascertained. Embodiments of the valve may prove very cost effective and relatively easy to manufacture.

I claim:

1. A fluid supply system comprising:
   (a) a reservoir having at least one wall;
   (b) at least one length of piping having one or more supply outlets; and
   (c) a connector having at least a first piece and a second piece having mutually interengageable snap-locking means so that said first and second pieces are adapted to be snap-locked together with said wall of said reservoir gripped therebetween, and with said connector surrounding a hole in said wall, (d) said connector and said length of piping having means for engaging each other so that, in use of said fluid supply system, fluid can be supplied from said reservoir through said connector and said hole and through said length of piping to said one or more supply outlets, (e) said reservoir being of such a size and dimensions relative to the remainder of said fluid supply system that said remainder can be wholly contained in said reservoir when said remainder is not connected to said reservoir, (f) said connector includes means to puncture said hole in said wall of said reservoir, (g) said hole is punctured automatically as said first and second pieces are snap-locked together with said wall of said reservoir therebetween, (h) said hole puncturing means is provided on one of said first and second pieces, (i) said first and second pieces flare outwardly at their ends which are held adjacent one another in use, with said wall of said reservoir being held between said ajacent ends, (j) said connector is of hard plastics; said reservoir is a plastics bag; and said wall of said reservoir is a frangible plastics membrane, and a snap-seal is provided at an open end of said reservoir.

2. A system as claimed in claim 1 in which
said first and second pieces are generally tubular and one of said first and second pieces has a male connecting portion at one end thereof to shap into a female portion of the other one of said first and second pieces, and
said female portion includes radially extending flange means to axially locate said male connecting portion in a snap-fit manner with said female portion.

3. A system as claimed in claim 1 in which
at least one of said female and male portions is resiliently deformed as said male portion is engaged in said female portion.

4. A two-part progressive flow valve for a fluid supply system, said valve comprising:
(a) a first part snap-engageable into a second part and being relatively rotatable therein between first and second angular positions,
(b) in said first angular position said valve is closed and in said second angular position said valve is fully open,
(c) said second part having a circular seating portion corresponding in diameter to a first circular portion of said first part so that in use said first portion is seated in said seating portion and rotatable about the axis of said seating portion,
(d) each of said first and second parts including a further circular portion and these further portions being arranged eccentrically to one another,
(e) said further portion of said first part including a bore extending generally radially thereof,
(f) the bore is blocked off by said further portion of said second part in said first angular position with said two further portions in engagement with a gap remote from a region surrounding said bore between said further portions, and (g) in said second angular position, said bore is not blocked off and said valve is fully open and there is a gap near the region surrounding said bore between said further portions.

5. A valve as claimed in claim 4 in which
said eccentricity is slight and over a wide angle of rotation of up to 180°, the rate of flow through the valve is increased only slightly,
said valve being a drip-feed.

6. A valve as claimed in claim 5 in which
the valve has alignment means including a tab on each of the first and second valve parts.

7. A valve as claimed in claim 4 in which
said second part is made of transparent plastics.

8. A valve as claimed in claim 4 wherein
the second part has a stepped internal diameter including said circular seating portion, and
the first part has a stepped external diameter which fits said stepped internal diameter and includes said first circular portion that engages said circular seating portion of the second part.

9. A valve as claimed in claim 4 wherein
the bore provides flow communication between the first and second parts via said gap to produce an axial flow through the valve when the second part is in a second angular position.

10. A fluid supply system comprising:
(a) a reservoir having at least one wall;
(b) at least one length of piping having one or more supply outlets; and
(c) a connector having at least a first piece and a second piece having mutually interengageable snap-locking means so that said first and second pieces are adapted to be snap-locked together with said wall of said reservoir gripped therebetween, and with said connector surrounding a hole in said wall;
(d) said connector and said length of piping having means for engaging each other so that, in use of said fluid supply system, fluid can be supplied from said reservoir through said connector and said hole and through said length of piping to said one or more supply outlets;
(e) said reservoir being of such a size and dimensions relative to the remainder of said fluid supply system that said remainder can be wholly contained in said reservoir when said remainder is not connected to said reservoir;
(f) said connector comprises a third piece;
(g) said first piece being a snap-fit engagement with said third piece and said second piece being a snap-fit engagement with one end of said third piece.

11. A system as claimed in claim 10 wherein
said end of said third piece is substantially identical to the other end of the said third piece.

12. A system as claimed in claim 11 wherein
said ends of said third piece extend beyond the ends of said first piece so that said pipe is attachable to said end of said third piece not engaging or not intended to engage said second piece.

13. A system as claimed in claim 12 wherein
said first piece is substantially identical with said second piece.

14. A system as claimed in claim 13 in which
the first piece is not resiliently deformed but rather snap-locked against an abutment on said second piece substantially simultaneously as said second and third pieces are snap-locked together.

15. A system as claimed in claim 10 in which
said connector includes a third piece and means to puncture said hole in said wall of said reservoir,
said hole is punctured automatically as sais first and second pieces are snap-locked together with said wall of said reservoir therebetween,
said hole puncturing means being of arrowhead shape and disposed on each end of said third piece.

16. A connector suitable for connecting two regions together separated by a wall or partition, said connector comprising:
 (a) at least a first piece and a second piece releasably snap-lockable together with said wall or partition gripped therebetween and with said connector surrounding a hole in said wall or partition,
 (b) said first piece being provided with a male portion, which in use passes through said hole in said wall and is snap-locked in the female portion of said second piece,
 (c) said second piece being generally tubular,
 (d) said female portion comprising a bore having a first portion flared in a direction towards said first piece when said first and second pieces are releasably locked together and in locking said female portion said flared first portion of said bore is engaged by a head of said male portion which resiliently deforms said second piece and/or is itself resiliently deformed until head snap engages a locking abutment on said female portion, at which location an annular gap is defined between said female portion and said male portion between the head and the remainder of said first piece,
 (e) said first piece being separable from said second piece first by closing the gap to thereby move said locking abutment in relation to said head so that said head and male portion may then be retracted from said female portion.

17. A fluid supply system comprising:
 (a) a reservoir having at least one wall;
 (b) at least one length of piping having one or more supply outlets; and
 (c) a connector having at least a first piece and a second piece having mutually interengageable snap-locking means so that said first and second pieces are adapted to be snap-locked together with said wall of said reservoir gripped therebetween, and with said connector surrounding a hole in said wall,
 (d) said connector and said length of piping having means for engaging each other so that, in use of said fluid supply system, fluid can be supplied from said reservoir through said connector and said hole and through said length of piping to said one or more supply outlets,
 (e) said reservoir being of such size and dimensions relative to the remainder of said fluid supply system that said remainder can be wholly contained in said reservoir when said remainder is not connected to said reservoir,
 (f) said supply outlets including a two-part progressive flow valve,
 (g) said valve comprising a first part snap-engageable into a second part and being relatively rotatable therein between first and second angular positions,
 (h) in said first angular position said valve is closed and in said second angular position said valve is fully open,
 (i) said second part having a circular seating portion corresponding in diameter to a first circular portion of said first part so that in use said first portion is seated in said seating portion and rotatable about the axis of said seating portion,
 (j) each of said first and second parts including a further circular portion and these further portions being arranged eccentrically to one another,
 (k) said further portion of said first part including a bore extending radially thereof,
 (l) the bore is blocked off by said further portion of said second part in said first angular position with said two further portions in engagement with a gap remote from a region surrounding said bore between said further portions, and
 (m) in said second angular position, said bore is not blocked off and said valve is fully open and there is a gap near the region surrounding said bore between said further portions.

* * * * *